United States Patent [19]

Hoeberigs

[11] Patent Number: 5,371,829
[45] Date of Patent: Dec. 6, 1994

[54] ROTATABLE HEATING APPARATUS FOR ARTICLES OF FOOD

[75] Inventor: Henricus Hoeberigs, Zedelgem

[73] Assignee: Jean M. M. Hoeberigs, Netherlands

[21] Appl. No.: 833,906

[22] Filed: Feb. 11, 1992

[30] Foreign Application Priority Data

Mar. 18, 1991 [BE] Belgium .............................. 09100251

[51] Int. Cl.⁵ .......................... A47J 37/00; H05B 3/00
[52] U.S. Cl. ..................................... 392/416; 219/389;
219/400; 99/443 R; 99/479
[58] Field of Search ................ 392/416, 418; 219/400,
219/388, 389, 405, 411; 99/443 R, 479; 34/126,
132; 366/146

[56] References Cited

U.S. PATENT DOCUMENTS

| | | | |
|---|---|---|---|
| 1,073,945 | 9/1913 | Warner | 34/126 |
| 1,613,235 | 1/1927 | Maueler | 34/126 |
| 1,673,296 | 6/1928 | McManus | 392/418 |
| 1,878,140 | 9/1932 | Hicks | 392/418 |
| 2,067,543 | 1/1937 | Purkett | 34/126 |
| 2,218,165 | 10/1940 | Gaebel | 219/405 |
| 2,265,421 | 12/1941 | Donnelly | 99/443 R |
| 2,646,495 | 7/1953 | Dornbush | 99/443 R |
| 3,121,621 | 2/1964 | Jackson | 34/126 |
| 3,204,549 | 9/1965 | Palowsky | 219/388 |
| 3,586,516 | 6/1971 | Terc | 219/400 |
| 3,902,254 | 9/1975 | Files | 34/132 |
| 4,203,357 | 5/1980 | Vaussanvin | 99/443 R |
| 4,222,322 | 9/1980 | van der Schoot | 99/479 |
| 4,506,652 | 3/1985 | Baker | 219/388 |
| 4,509,275 | 4/1985 | Coffman et al. | 34/126 |
| 4,691,447 | 9/1987 | Nakai | 219/400 |
| 4,817,509 | 4/1989 | Erickson | 219/400 |
| 5,134,927 | 8/1992 | McCarthy, III et al. | 219/389 |
| 5,182,981 | 2/1993 | Wilcox | 219/389 |
| 5,193,444 | 3/1993 | Bar-Sheshet | 219/400 |
| 5,315,919 | 5/1994 | Hoeberigs | 219/400 |

FOREIGN PATENT DOCUMENTS

464595 8/1928 Germany .............................. 34/126

*Primary Examiner*—Bruce A. Reynolds
*Assistant Examiner*—John A. Jeffery
*Attorney, Agent, or Firm*—Nixon & Vanderhye

[57] ABSTRACT

A heating apparatus for articles of food comprises a receptacle (4) where the articles of food which are to be heated are brought and which may rotate around a axis during heating. The apparatus further comprises a cover (6) which forms with the receptacle (4) substantially closed chamber during heating. The axis may form an adjustable first angle with a vertical line. The apparatus further comprises a roof (6) which may rotate relatively with regard to the recipient (4) over a second angle which is smaller than 60° to allow for filling or emptying the heating apparatus with articles of food. The heating apparatus may be used for substantially all articles of food which may be heated and the apparatus has a good thermal efficiency.

11 Claims, 5 Drawing Sheets

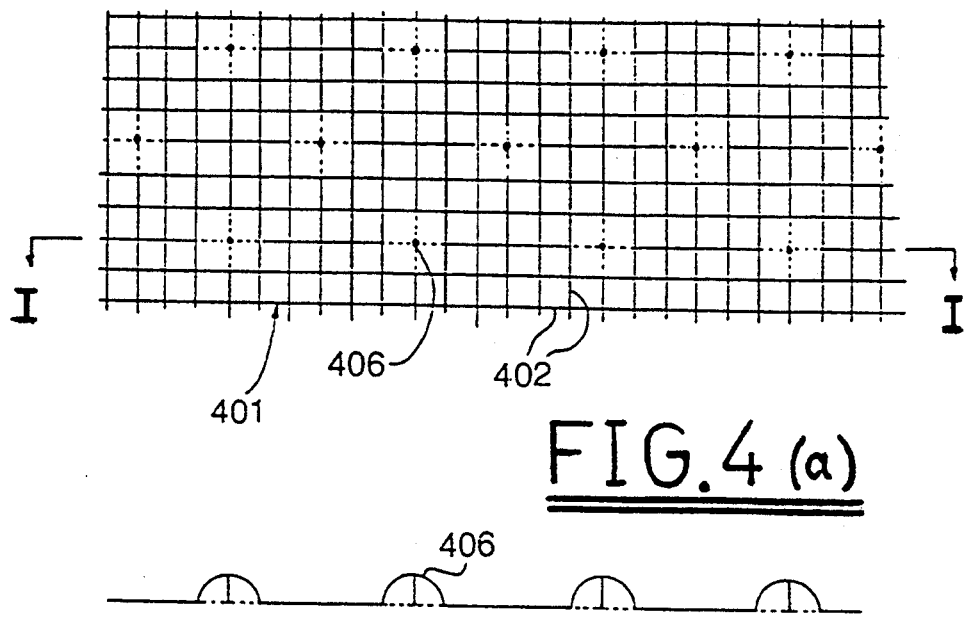
FIG. 4 (a)
FIG. 4 (b)
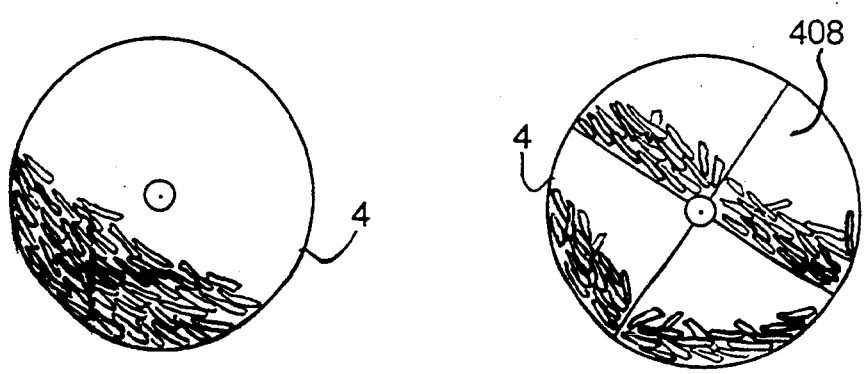
FIG. 5 (a)
FIG. 5 (b)

ROTATABLE HEATING APPARATUS FOR ARTICLES OF FOOD

BACKGROUND OF THE INVENTION

The invention relates to a heating apparatus for articles of food.

The terms "heating" and "to heat" refer in what follows to the warming of articles of food for a meal and may mean warming up, baking, frying, grilling or the like.

The term "articles of food" refers in what follows to almost all articles of food which may be heated such as french fries, croquettes, chips, bread, meat, fish, pizza or the like.

It is pointed out that the invention relates to a so-called "dry" method to heat articles of food that is, the articles of food are not immersed in a bath of oil or fat. Furthermore, the food articles may have possibly been provided with a small layer of fat or have already been baked beforehand and, according to the invention, they are heated with the help of infrared and/or hot air.

From patent application WO-A-89/10085 (application number PCT/BE89/00017) a heating apparatus which applies the dry method is known. A receptacle wherein the articles of food are received, rotates around an oblique axis. The bottom of the receptacle is roughened which takes care of a continuous movement of the articles of food. The filling of the arrangement is rather simple by way of a funnel and a blockable slide. This funnel and slide are situated above the obliquely arranged receptacle. This increases the distance between the heating elements and the articles of food to the detriment of the thermal efficiency of the arrangement. For the emptying of the receptacle, on the other hand, a rather large rotation of the receptacle is necessary. Furthermore, this rotation is only possible with a limited dimension of the receptacle. If the receptacle larger, it must first make a downward movement before rotation can start. This complicates the required mechanism and harms the compactness. Another drawback is that when the receptacle is returns to the heating position after emptying, the walls of the receptacle must form a good closing with the bell-glass as otherwise hot air escapes during baking or heating. Such a closing, however, is not always easy to realize.

Another important drawback of the apparatus of patent application WO-A-89/10085 is that it is only fitted for articles of food which comprise small parts which are loose with regard to each other, such as french fries, chips and croquettes.

It is an object of the invention to provide for an apparatus which avoids the drawbacks of the state of the art.

It is a major object of the invention to provide for an apparatus which may heat different kinds of articles of food.

It is also an object of the present invention to provide for an apparatus which allows the filling and emptying of the apparatus in a simple way.

It is another object of the invention to provide for an apparatus with improved thermal efficiency.

It is still another object of the invention to provide for an apparatus which heats the articles of food as homogeneously as possible.

SUMMARY OF THE INVENTION

The invention provides for a heating apparatus for articles of food comprising a receptacle where the articles of food which are to be heated are brought and which may rotate around a first axis during heating, an inner side and a cover, the cover forming at the inner side an almost closed chamber during heating. The first axis forms a first angle with a vertical line. This first angle is adjustable over the whole range between 0° and 45°, both limits being included. The (first) angle which is made by the first axis with the vertical line is dependent upon the kind of articles of food:

about 45° for french fries about 30° for croquettes about 0° (hence about vertical) for pizzas, loafs of bread, meat ware, fish, ready-made meals, and the like.

In case of articles of food which consist of small parts which are loose with respect to each other, the bottom of the receptacle is roughened which allows continuous movement of the articles of food during the rotation of the recipient.

Preferably, the cover has substantially hemispherical form. Such an embodiment promotes the thermal efficiency of the apparatus since half a globe has little surface for a relatively large volume and since half a globe reflects very well the infrared rays and/or hot air on the articles of food.

In order to allow for filling and/or for emptying the heating apparatus with articles of food several embodiments are possible:

The apparatus may further comprise means such that the cover may rotate with regard to the receptacle over a second angle to allow for filling or emptying the heating apparatus with articles of food. The rotation of the cover with respect to the receptacle may be done around a second axis which forms substantially a tangent with the receptacle. As will be clear hereinafter, such an embodiment has the advantage that the heating elements may be arranged closer to the articles of food.

The apparatus may also further comprise means to move the receptacle from under the cover over a horizontal path to allow for filling and/or emptying the heating apparatus with articles of food. The means to move the receptacle may comprise a grooved guide.

The apparatus may also comprise both means to rotate the cover with respect to the receptacle and means to move the receptacle from under the cover horizontally.

Preferably, the bottom of the receptacle has a structure in the form of a netting. The openings of the netting are obviously smaller than the articles of food to be heated. Dependent upon the case, the bottom is provided with bulges which subject the articles of food to a continuous movement during the rotation of the receptacle. The advantage of such a netting structure is that the hot air may heat the articles of food also from underneath, thereby promoting thermal efficiency.

An example of such a receptacle is a flat metal net or a small basket made of metal net wherein the articles of food may be easily introduced.

The receptacle - whether or not in the form of a basket - may be divided into separate compartments or segments. This has the advantage that separate portions may be treated in the apparatus and also a different number of portions, going from one to a maximum number of portions.

According to another embodiment of the invention, the cover has at least in the neighbourhood of the bottom, over a determined height, the form of a spherical segment, and the relative rotation between the receptacle and the cover is accomplished around a second axis which lies in a plane parallel to the plane of the bottom. The center of the spherical segment lies on this second axis and the determined height corresponds with the second angle around which the rotation is accomplished.

As will be clear hereinafter, such an embodiment has the advantage that it may be easily built in an automaton.

BRIEF DESCRIPTION OF THE DRAWINGS

The invention is now explained in more detail with reference to the figures whereby

FIG. 4 shows part of a bottom of a recipient which has been made of a metal net;

FIG. 5 shows a schematic representation of a receptacle which is not divided into segments and a receptacle which is divided into segments;

FIG. 6(a) shows the apparatus in a position for emptying or filling while

DESCRIPTION OF THE PREFERRED EMBODIMENTS

Figure 1:
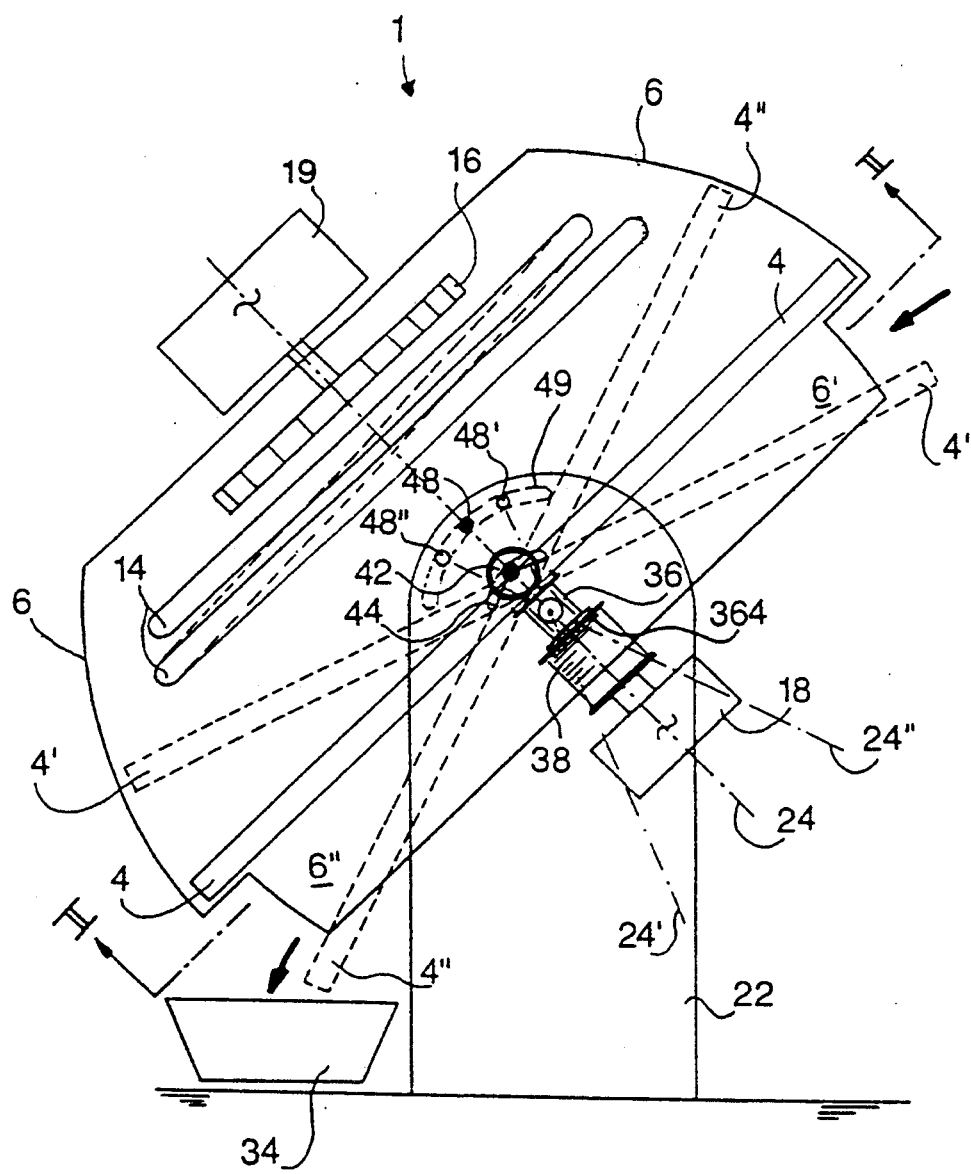
FIG. 1 represents a side view of an embodiment according to the invention.
Figure 2:
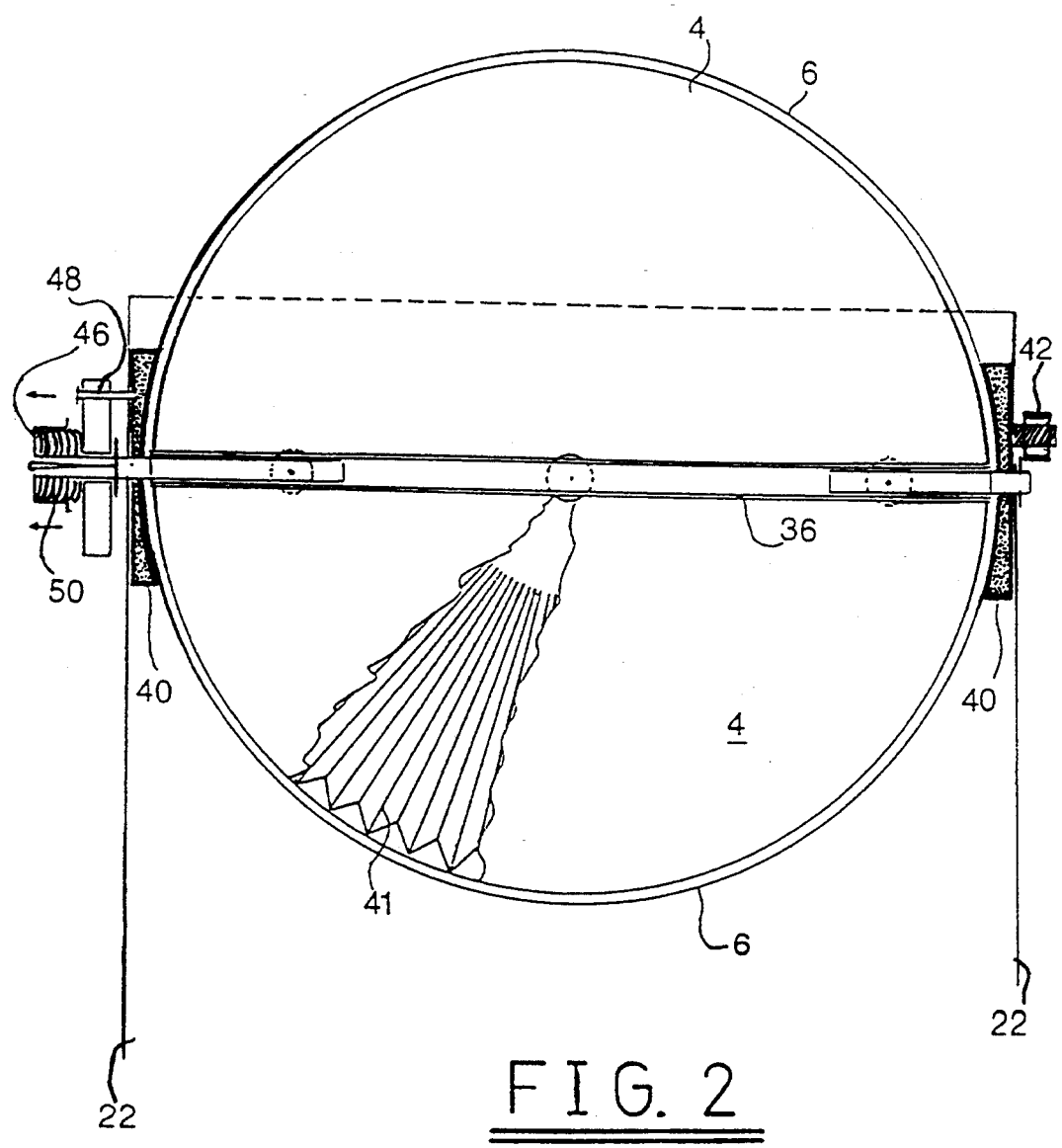
FIG. 2 represents a cross-section according to plane II—II in FIG. 1.

Referring to FIG. 1 and FIG. 2 1 represents an arrangement for heating articles of food. The arrangement 1 has been mounted on a base foot 22. During heating the articles of food are on the flat receptacle 4. The receptacle is rotatable around a central, obliquely adjustable axis 24. If the articles of food consist of small parts which are loose with respect to each other, then the roughnesses 41 interact with the articles of food during rotation of the receptacle 4 such that the articles of food are subjected to a continuous movement and are heated or baked homogeneously over their complete surface. The receptacle 4 is rotatably mounted on a horizontal axis 36.

An electrical motor 18 drives the receptacle 4. Between the motor 18 and the recipient there is a thermal insulation 38 since the temperature of the receptacle may reach 250° C. during baking or heating.

The driving may also be done by means of a gear system via the side of the apparatus.

A cover 6 forms with the recipient 4 a closed room during baking or heating. This cover 6 does not rotate during baking or heating. Within this closed chamber are electrical heating elements 14 and a ventilator 16 which takes care for the circulation of the hot air. The ventilator is driven by means of an electrical motor 19.

The angle formed by the axis 24 with the vertical line, may be changed by means of a screw 42 in the slot 44. Owing to this the obliqueness of the cover 6 and of the horizontal axis 36—and as a consequence also of the receptacle 4—changes simultaneously. For the filling of the articles of food the horizontal axis 36 rotates with the receptacle 4 until the position (4') which has been represented in dotted lines in FIG. 1. This rotation may be done by pulling out the adjustment knob 46. By means of a spring 50, a pin is released from hole 48 and the pin may be brought into hole 48'. Since the cover 6 has the form of a spherical segment, the center of which is on axis 36, the receptacle nowhere touches the cover during this rotation. At the side of the highest part of the receptacle 4' an opening for the filling of the articles of food is created between the part of the cover which reaches until under the receptacle and the receptacle in position 4'.

In an analogous way, the receptacle may rotate until the position (4") which is also indicated on FIG. 1 in dotted lines to empty the articles of food in a dish 34 after heating or baking. This is also done by pulling out adjustment knob 46 bring bring the pin in hole 48". At the side of the lowest part of the receptacle 4" an opening for emptying the articles of food is created between the part of the cover 6" which reaches until receptacle 4 and the receptacle in position 4".

More referring to FIG. 2 pieces of insulating material 40 are between the foot 22 and the roof 6 at the extremities of the horizontal axis 36. These pieces 40 keep the cover in balance by means of screws (not shown). After removing of the screws (not shown) the arrangement may be disassembled into three large parts for cleaning and maintenance. That is, the foot 22, the horizontal axis 36 with the rotatable receptacle 4 and the cover with the ventilator and the heating elements. The mounting of these parts is also performed easily. A number of parts are standard parts which are available in commerce (such as the electrical motors 18 and 19 and the ventilator 16) and the other parts are simple and easy to manufacture in mass production.

The embodiment as described in FIGS. 1 and 2 may be used in an automaton since the filling and emptying of the apparatus and the relative rotation of the receptacle with respect to the cover can be easily automated.

Figure 3:
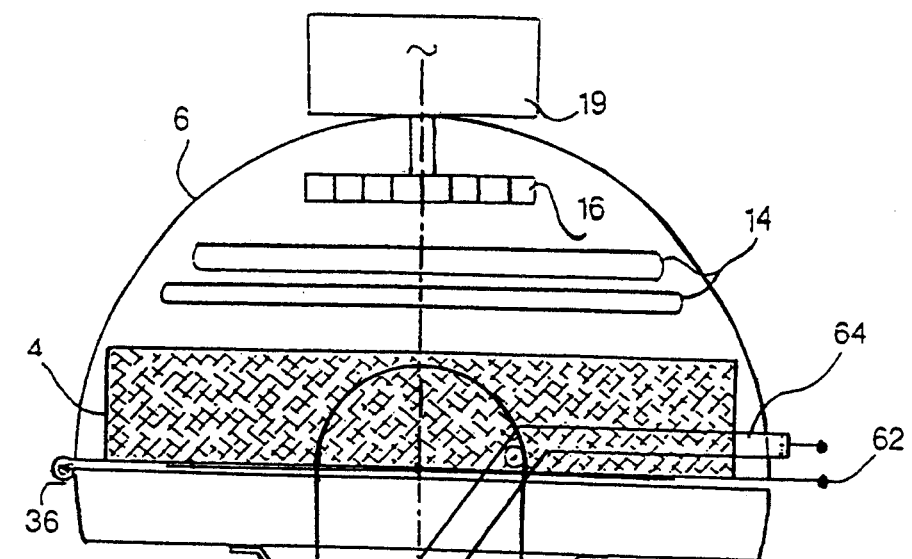
FIG. 3 represents a side view of another embodiment of an apparatus according to the invention.
Figure 3:
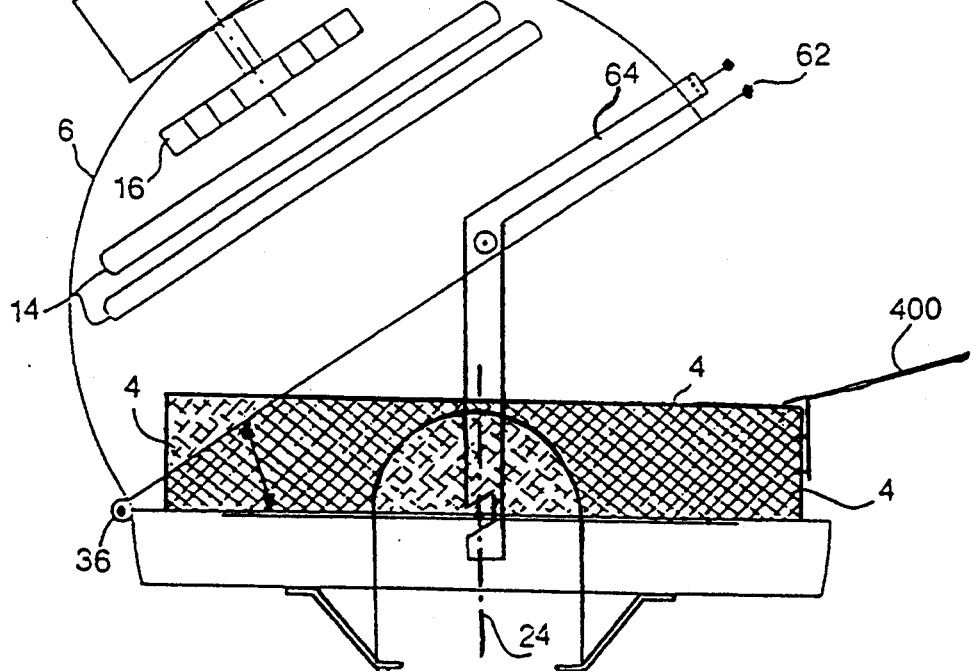

In FIG. 3 a preferable embodiment of the invention has been shown. The axis 24 is vertical, for example for baking pizzas, but the axis may also be obliquely arranged such as in FIG. 1. The means thereto are not shown for reasons of clarity of the drawing. The axis 36, around which the relative rotation of the cover 6 with respect to the receptacle 4 is done, is at the side of the apparatus, at the height of a tangent to the plane of the bottom of the receptacle. Such a location of the axis 36 has the advantage that the cover needs only to rotate over a limited angle to fill or to empty the apparatus with articles of food which is represented specifically in FIG. 3(b). This angle may safely be smaller than 45°, and is, for example, 40°.

The heating elements 14, the ventilator 16 and the motor 19 for the ventilator may be connected fixedly to the cover 6 and, as a consequence, they move together with the cover. This has the advantage that the heating elements 14 may be arranged rather closely to the receptacle 4 without hindering the rotation of the cover 6 with respect to the receptacle 4. This promotes the thermal efficiency of the apparatus.

In the case of the apparatus of FIG. 3, the receptacle 4 consists of a basket of a metal net which may be put into the apparatus and removed from the apparatus by means of a special fork 400. The apparatus may be opened by means of a handle 62, and a small rod 64 which allows the apparatus to remain in an open position.

FIG. 4 represents part of a metal net 401 which consists of longitudinal and crossing wires 402 and which forms the bottom of the receptacle 4. For the treatment of articles of food which consist of small parts which are loose with regard to each other, the bottom 401 is preferably provided with bulges 406 which cause the continuous movement of the articles of food during rotation of the receptacle 4 when the receptacle is in an oblique position.

The arrangement is fitted for domestic use and for use in a restaurant. As an apparatus for domestic use, the arrangement may bake for example 500 g of french fries in about 150 seconds with a heating power of 1800 W (Watt). Such a domestic arrangement needs very little space for example 300×300×275 mm. If the receptacle 4 is divided into four different segments 408, as represented in FIG. 5(b), then about 125 g, 250 g, 375 g or 500 g may be baked simultaneously.

If the receptacle 4 is divided into different segments 408 and a large quantity of french fries is baked simultaneously, positioning into different segments has the advantage that the french fries remain equally divided over the segments and, because of the oblique position of the axis - do not heap up at a determined place. As a consequence, portioning promotes the regular and homogeneous heating. This is apparent from the comparison of FIG. 5(b) with FIG. 5(a), where a receptacle has been represented which has not been divided into different segments.

As an apparatus for use in a restaurant, the arrangement may for example bake 1 kg of french fries in 180 seconds with a power of 2800 W. The dimensions of such an apparatus for use in a restaurant are, for example, 450×450×350 mm.

Figure 6A:
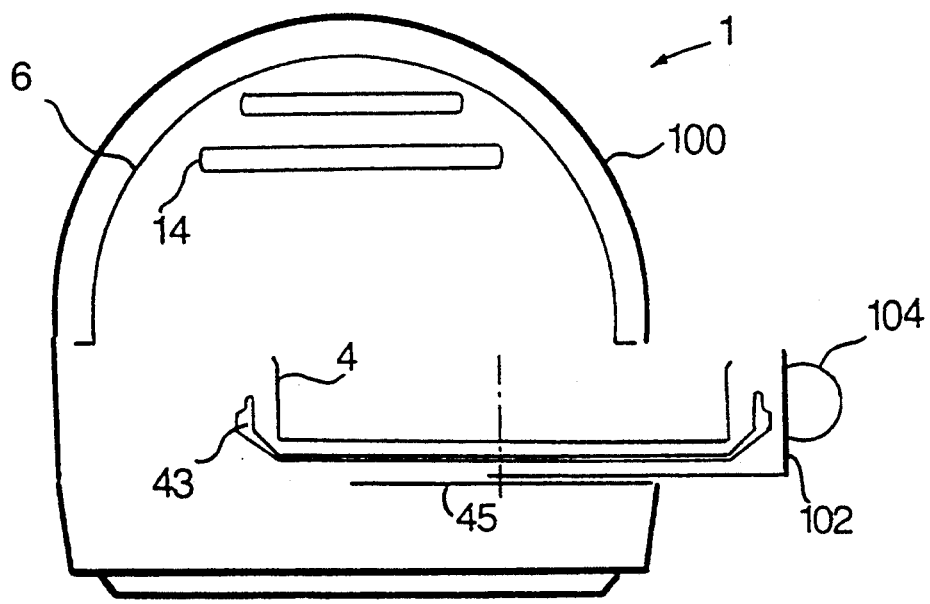
FIGS. 6(a) and (b) are schematic representations of yet another embodiment of an apparatus according to the invention.
Figure 6B:
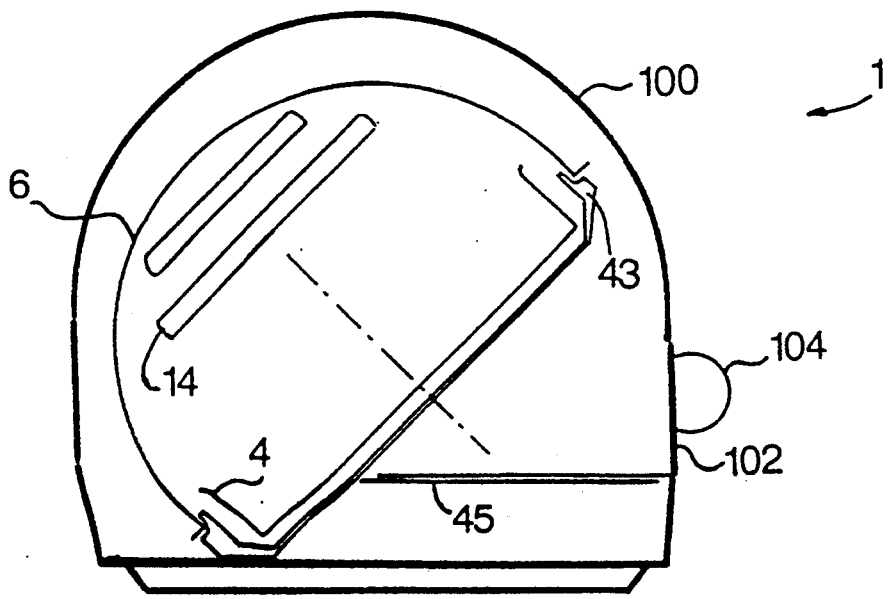
FIG. 6(b) shows the apparatus in a position for heating.

FIG. 6(a) shows schematically another embodiment of an apparatus 1 according to the invention during a standstill, so in a position for emptying or filling the receptacle 4. Part 102 of the exterior housing 100 is guided by a groove guide 45 and may be pulled horizontally by a handle 104. The receptacle 4 and a base plate 43 move simultaneously from under the cover 6 away to allow for filling or for emptying the recipient 4. FIG. 6(b) shows the same embodiment in a position for heating french fries since the angle made by the receptacle with a vertical axis is about 45°.

I claim:

1. A heating apparatus for articles of food comprising:
    a receptacle for holding articles of food which are to be heated and which is rotatable around a first axis during heating,
    an inner side, and
    a cover,
    the inner side including (1) heating elements for heating air in the inner side and (2) a ventilator for creating a hot air current,
    the cover forming at the inner side a substantially closed chamber during heating, the first axis forming a first angle with a vertical line, the first angle being adjustable over the entire range between 0° and 45°, inclusive, and
    structure to mount the cover for relative rotation with regard to the receptacle over a second angle to allow for filling or emptying the heating apparatus with articles of food, wherein
    the cover has at least in the neighborhood of the bottom over a determined height the form of a spherical segment, and wherein
    the relative rotation between the receptacle and the cover is around a second axis which lies in a plane which is parallel to the plane of the bottom and wherein the center of the spherical segment lies on the second axis and the determined height corresponds with the second angle.

2. A heating apparatus according to claim 1 wherein the cover is substantially in the form of a hemisphere.

3. A heating apparatus according to claim 1 or 2 wherein the receptacle is divided into segments or compartments.

4. A heating apparatus according to claim 1 wherein the rotation of the cover with respect to the receptacle is around a second axis which forms substantially a tangent with the receptacle.

5. A heating apparatus according to claim 1, wherein the apparatus further comprises a mounting assembly for the receptacle to permit movement of the receptacle from under the cover over a horizontal path to allow for filling or emptying the heating apparatus with articles of food.

6. A heating apparatus according to claim 5 wherein the mounting assembly includes a groove guide.

7. A heating apparatus according to claim 1, wherein the apparatus comprises (1) structure to mount the cover for rotation with regard to the receptacle over a second angle to allow for filling or emptying the heating apparatus with articles of food, and (2) a mounting assembly for the receptacle to permit the receptacle to move from under the cover over a horizontal path to allow for filling or emptying the heating apparatus with articles of food.

8. A heating apparatus according to claim 1 wherein the bottom of the receptacle has a structure in the form of a netting.

9. A heating apparatus according to claim 8 wherein the receptacle is a metal net.

10. A heating apparatus according to claim 9 wherein the receptacle is formed by the bottom of a basket made of metal net.

11. A heating apparatus according to claim 9 wherein the bottom of the receptacle is provided with bulges.

* * * * *